United States Patent [19]

Otty

[11] Patent Number: 4,533,580
[45] Date of Patent: Aug. 6, 1985

[54] COMPOSITE INSULATION MATERIAL

[76] Inventor: Malcolm Otty, Westering, Mill Hay Rd., Caldy, Merseyside, England

[21] Appl. No.: 601,126

[22] Filed: Apr. 19, 1984

Related U.S. Application Data

[63] Continuation of Ser. No. 392,618, Jun. 28, 1982, abandoned.

[30] Foreign Application Priority Data

Jul. 1, 1981 [GB] United Kingdom ............... 8120234

[51] Int. Cl.³ .............................................. B32B 3/06
[52] U.S. Cl. .................................. 428/36; 174/138 E; 310/45; 310/215; 428/102; 428/284; 428/324
[58] Field of Search ................. 174/138 E; 310/215, 310/45, 208; 428/102, 252, 287, 284, 324, 402, 407, 35, 36

[56] References Cited

U.S. PATENT DOCUMENTS

| | | | |
|---|---|---|---|
| 3,189,681 | 6/1965 | Feather | 310/215 |
| 3,841,959 | 10/1974 | Mertens | 428/324 |
| 4,013,987 | 3/1977 | Foster | 428/324 |
| 4,033,805 | 7/1977 | Mitsui et al. | 428/324 |
| 4,085,250 | 4/1978 | Smith | 428/324 |
| 4,091,139 | 5/1978 | Quirk | 428/324 |
| 4,273,825 | 6/1981 | Nishiyama et al. | 428/324 |

FOREIGN PATENT DOCUMENTS 1257501 12/1971 United Kingdom .
1314546 4/1973 United Kingdom .

Primary Examiner—James J. Bell
Attorney, Agent, or Firm—Oblon, Fisher, Spivak, McClelland & Maier

[57] ABSTRACT

A composite insulating material for the coils of large rotating electric plant comprises a central layer of resinous mica paper between outer layers of high temperature textile material, such, for example, as stitch bonded high temperature nylon fibres. The material may be provided in the form of a channel section which, with a complementary such section, fits over a straight slot-fitting section of the coil in the form of a sleeve, which may be consolidated on the coil by a coil pressing operation.

9 Claims, 6 Drawing Figures

COMPOSITE INSULATION MATERIAL

This application is a continuation of application Ser. No. 392,618 filed June 28, 1982 now abandoned.

BACKGROUND TO THE INVENTION

This invention relates to insulation material, particularly insulation material suitable for the coils of large rotating electric plant.

Conventionally, large motors, especially those operating at 3.3 KV and higher voltages, have so-called "circumferential" or "diamond" coils comprising shaped turns of conductor, connected by "overhang" sections. The slot-fitting sections must be well insulated. This is conventionally done by wrapping the sections in one of a number of different insulating materials, usually containing mica. The mica may be in the form of particles carried in a resin. There are two basic techniques, one, "resin-rich", being essentially based on such mica paper; the other, so-called vacuum pressure impregnation (VPI), involving impregnating the insulation once on the coil (or even on the coils once on the stator) with a resin. The resin is distributed uniformly around the coil by heat, as by a hot pressing, shaping operation on the coil in a coil press.

The insulating material conventionally comprises a tape, which is wound helically on to the straight, slot-fitting sections of the coil.

BRIEF DESCRIPTION OF THE INVENTION

The present invention provides an improved insulation material as well as improved insulation techniques based on it.

The invention comprises a composite insulation material for the coils of large rotating electric plant comprising a central layer of resinous mica paper between outer layers of high temperature textile material.

The central layer may be bonded to the outer layers by the resin of the central layer. The bonding may be effected by heat, as by dielectric heating, which melts or softens the resin in the mica paper and causes it to adhere to the fibres of the textile material.

Preferably, the resin is confined, after the bonding, to the interface between the textile material and the mica paper, leaving the outer faces of the outer layers as resin-free textile material.

The composite insulating material can be made in the form of a channel section. Complementary channel section members may be adapted to fit together to form a sleeve. In this way, the time-consuming operation of helically wrapping the slot-fitting section is avoided. The application of the material to the coil involves simply slipping the two complementary channel sections on to each straight coil section.

The bonding of the composite material may be carried out while the composite is in the form of a channel section so that it remains in channel section configuration after the bonding. Complementary pairs of channel section members may be made together by assembling two composites separated by a layer of release material and effecting the bonding step.

A plurality of composites may be stacked between dielectric heating electrodes for simultaneous bonding.

The invention also comprises a method of insulating the coils of large rotating electric plant, in which at least one channel section insulating member is placed lengthwise over a straight slot-fitting section of the coil and consolidated thereon. The insulating member may be impregnated with resin prior to being consolidated by heat-curing of the resin. The consolidation may be effected by a coil pressing operation, or the coil with its applied insulating member can be wound in a stator and the whole wound stator treated by a vacuum pressure impregnation process.

BRIEF DESCRIPTION OF THE DRAWINGS

Embodiments of composite insulating materials and methods of making them and applying them to coils according to the invention will now be described with reference to the accompanying drawings in which.

DETAILED DESCRIPTION OF THE PREFERRED EMBODIMENTS

Figure 1:
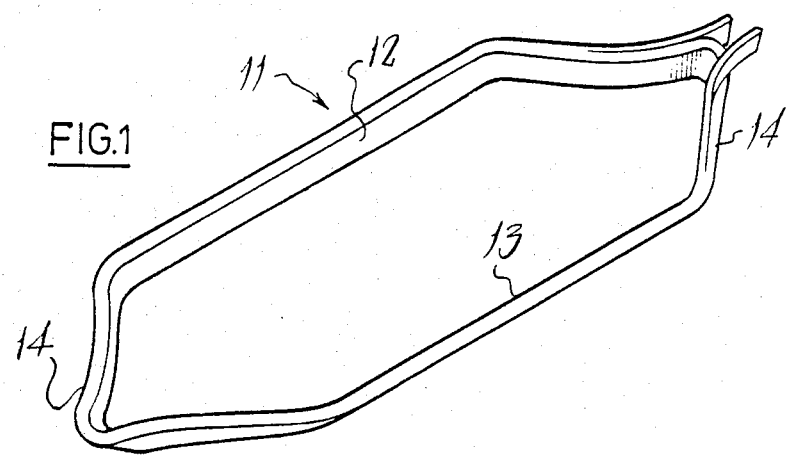
FIG. 1 is a perspective view of a coil of a large electric motor.

The coil 11 illustrated in FIG. 1 comprises a loop of several turns of rectangular section copper wire spread into a so-called "diamond" shape having parallel, straight slot-fitting sections 12, 13 which are, however, twisted with regard to each other so as to fit into radial slots at different circumferential positions. The wire is protected with a primary insulation which might be a varnish coating coupled with a wrapping of tape, to insulate the turns of the coil one from the next. The most important insulation, however, is that between the straight section 12, 13 and the slot of the stator when the coils are wound into it—the potential between the copper of the coil and the laminations of the stator can be 3.3 KV, 6.6 KV, 11 KV or higher, depending on the application. The insulation is usually applied by wrapping the straight sections 12, 13 with helical turns of an insulating tape usually, nowadays, comprising mica particles contained in a resinous matrix, usually referred to as "mica paper".

The mica paper has some inherent disadvantages. It is first of all somewhat brittle, not taking readily to sharp bends, and tending, on account of its relative stiffness (it is only uniaxially flexible) to "grin" where the straight sections 12, 13 begin to turn into the overhang sections 14.

Wrapping the tape helically on the straight section 12, 13, moreover, is a time-consuming, labour-intensive operation.

Figure 2:
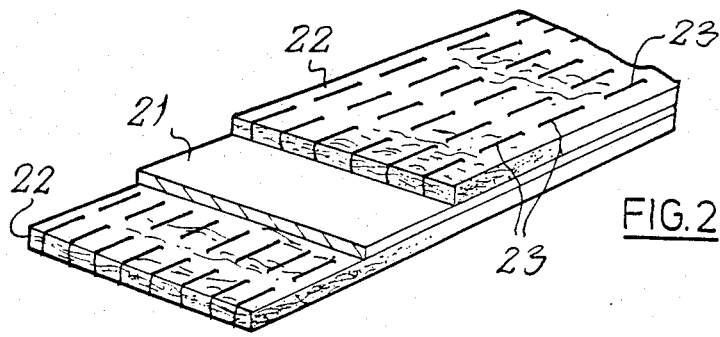
FIG. 2 is a perspective view of a composite insulation material according to the invention.

The composite insulation material illustrated in FIG. 2 comprises a central layer 21 of resinous mica paper between outer layers 22 of high temperature nylon stitch bonded fabric. The fabric 22 comprises a batt of fibres stitched with parallel rows of warp yarn stitches 23. The bonding between the central layer 21 and the outer layers 22 is effected by using the resin of the mica paper, which is melted, as by dielectric heating. A typical mica paper has an 80% resin load.

Figure 3:
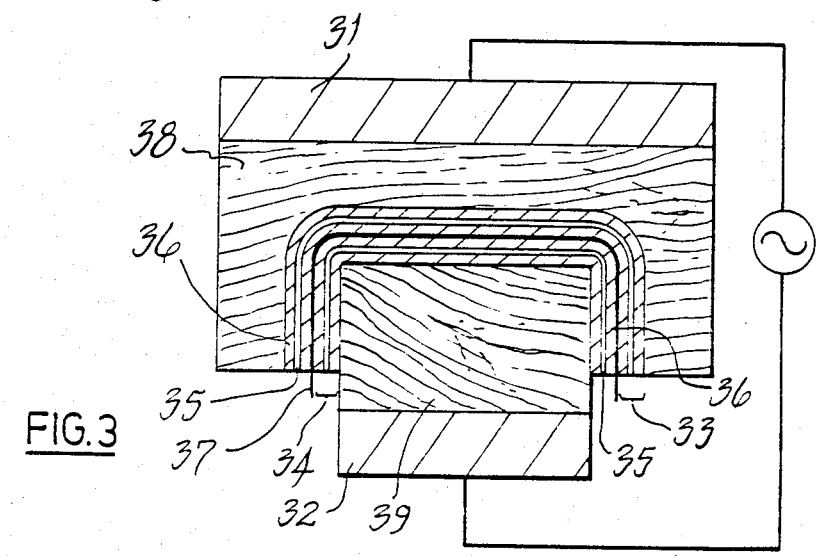
FIG. 3 is a cross-section through a composite material in a bonding apparatus.

The bonding may be carried out between electrodes 31, 32 as shown in FIG. 3. Between these electrodes are arranged two composites 33, 34, each comprising a central layer of mica paper 35 and outer layers 36 of the high temperature textile material. The composites 33, 34 are separated by a layer of release paper 37.

The dielectric heating is effected by applying a suitable voltage (say 20 KV) and frequency (say 15 MHz) to the electrodes.

The electrodes 31, 32 have hardwood formers 38, 39 shaped so as to bond the composites in the form of channel sections which form they retain after the bonding when the resin hardens again. The bonding conditions (frequency of applied field, pressure, duration) are so adjusted that resin from the mica paper flows into the contiguous faces of the textile material, but does not penetrate right through the material. The hardwood does not heat up nearly so fast as the resin, nor does the textile material, under the high frequency field. The resultant channel section, bonded composites, therefore, have resin-free outer faces and are resiliently compressible on that account.

Figure 4:
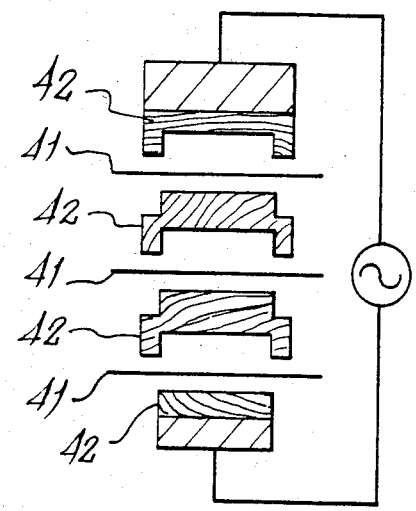
FIG. 4 is a cross-section through a stack of composite materials in a bonding apparatus.

FIG. 4 illustrates how a stack of composites 41 can be bonded together in a stack of shaped formers 42. A three-high stack is shown, but a ten-high stack would be used in practice.

Figure 5:
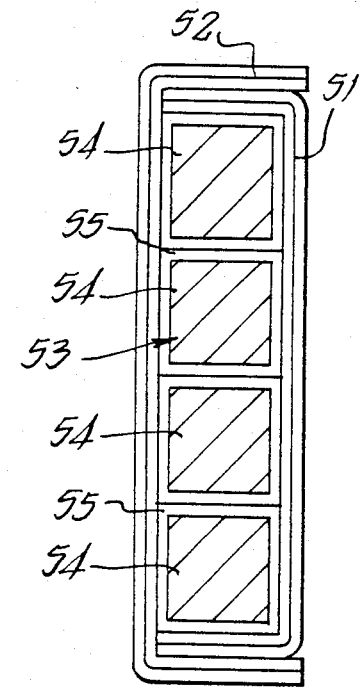
FIG. 5 is a cross-section through a straight slot-fitting section of a coil with composite insulation material fitted to it.

FIG. 5 illustrates how the channel section composites 51, 52 are arranged around a slot-fitting section 53 of a coil. The section 53 comprises four turns of square-section copper 54 provided with primary, dry-tape inter-turn insulation 55. The smaller, 51, of the composites, having been made to the required length, is slipped over the length of the straight section 53, then the larger channel-section composite 52 slipped from the other direction over the previously fitted composite 51 to form between them a sleeve totally enclosing the section 53.

Although this insulation could be "set" on the coil by heat and pressure in a coil press, the insulation is particularly adapted to being fully impregnated in situ in a stator. It may be desirable first to give the coil a preliminary, short duration hot pressing operation just to attach the composites firmly enough to withstand winding the coil into the stator.

Figure 6:
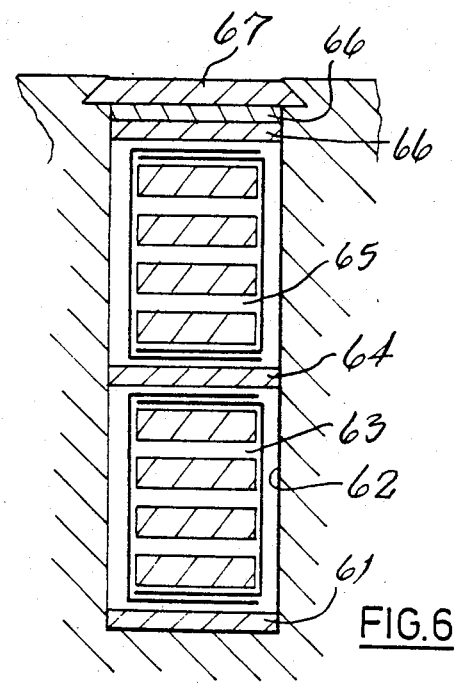
FIG. 6 is a cross-section through stator slot with two coils wound into it.

The coils can be wound, two to a slot, as illustrated in FIG. 6. First, a layer 61 of high temperature textile material is placed at the bottom of the slot 62. Then the first coil 63 is introduced, then another layer 64 of the textile material. The second coil 65 is introduced and on top of that a further layer or layers 66 of the textile material as required to level off the assembly with the base of a slot wedge 67. The wedge places the assembly in a state of compression. Because of the resilience of the textile material (a stitch bonding material being very suitable for this purpose because of its inherent resiliency) the slot will be essentially "filled" with the materials.

The insulation material still requires to be impregnated with resin, which is now done, after the complete stator has been wound, by a vacuum/pressure impregnation process in which the stator is mounted in a treatment chamber which is first evacuated to remove all air from the interstices of the insulating materials then loaded with liquid resin and pressurised. The resin flows along the slots to impregnate the textile materils. Again, stitch bonded fabric is very suitable because of its fibrous structure, which allows a free resin route all along the slot. The resin is hardened after the impregnation step.

A disadvantage of mica paper that has already been remarked on, namely its brittleness, is substantially avoided in the methods described herein. In the first place, the mica paper tape is not used for any helical winding on the straight, slot-fitting saections of the coil. But in any event it is found that combining it with a textile material as described herein does not result in cracking.

Of course, the composite insulation material described herein can be used in other ways, and, instead of conventional mica paper, which has minute mica particles suspended in a resin matrix, can be used flake mica assemblies capable of withstanding higher voltages. Moreover, the methods of insulating coils described herein in which the conventional helical wrapping is abandoned in favour of a sleeve of material, can be effected with any of these materials or even with other more conventional insulating materials that are capable of being presented in the form of a sleeve or sleeve components. Nor is it necessary to adopt the precise form of sleeve illustrated. Instead of a two-section sleeve, for example, a one piece sleeve could be used having a lengthwise overlapped opening by virtue of which it can be fitted laterally on to the coil section.

What I claim is:

1. A composite insulation material for the slot-fitting coils of large rotating electric plants comprising:
    a micaceous layer; and
    outer layers of a textile material capable of being compressed and of absorbing resin, said composite insulation material being preformed in the form of a channel section having an elongated concavity shaped for application to the slot fitting portion of a coil.

2. A composite insulation material according to claim 1, in which the high temperature textile material comprises high temperature nylon fibres.

3. A composite insulation material according to claim 1, in which the textile material is a stitch bonded fabric.

4. A composite insulation material according to claim 1, in which the central layer is bonded to the outer layers by the resin of the central layer.

5. A composite insulation material according to claim 4, in which the central layer is heat bonded to the outer layers.

6. A composite insulation material according to claim 4, in which the central layer is bonded to the outer layers by dielectric heating.

7. A composite insulation material according to claim 1, in the form of complementary pairs of channel section members, adapted to fit together to form a sleeve.

8. A composite insulation material according to claim 1, in which the micaceous material comprises mica paper.

9. A composite insulation material according to claim 1, in which the micaceous material comprises flake mica.

* * * * *